United States Patent [11] 3,626,014

[72] Inventor Robert J. Harvey
 Teaneck, N.J.
[21] Appl. No. 711,845
[22] Filed Mar. 11, 1968
[45] Patented Dec. 7, 1971
[73] Assignee Halcon International, Inc.

[54] PROCESS FOR PREPARATION OF ORGANIC PEROXIDES
 11 Claims, No Drawings
[52] U.S. Cl. ................................................. 260/610
[51] Int. Cl. .......................................... C07c 73/00
[50] Field of Search ............................................. 260/610, 610 D

[56] References Cited
 UNITED STATES PATENTS

| | | | |
|---|---|---|---|
| 2,414,769 | 1/1947 | Rust et al. | 260/610 |
| 2,403,758 | 7/1946 | Rust et al. | 260/610 |
| 2,668,180 | 2/1954 | Boardman | 260/610 |
| 2,819,255 | 1/1958 | Boardman | 260/610 |
| 3,337,639 | 8/1967 | Stedehouder et al. | 260/610 |

*Primary Examiner*—Bernard Helfin
*Assistant Examiner*—W. B. Lone
*Attorneys*—William C. Long, Morris Wiseman, David Dick and Mario A. Monaco

ABSTRACT: This invention relates to an improved process for the production of organic peroxides by reaction between organo-boron compounds and organic hydroperoxides or alcohols. The process of this invention is applicable to the manufacture of symmetrical as well as asymmetrical peroxides and in many embodiments is able to produce peroxide from the starting materials in almost quantitative yields. In particularly preferred embodiments this invention relates to the preparation of di-tertiary-alkyl peroxides such as, for example, di (t-butyl) peroxide and di-t-amyl peroxide and to the preparation of di-aralkyl peroxides such as, for example, di (alpha-phenylethyl) peroxide and di-cumyl peroxide.

PROCESS FOR PREPARATION OF ORGANIC PEROXIDES

BACKGROUND OF THE INVENTION

Organic peroxides (i.e., compounds having the structural formula R—O—O—R' wherein R and R' are the same or different organic radicals) are extremely valuable articles of commerce, useful as initiators and/or catalysts in polymerizations and other chemical reactions as well as being useful cetane number improvers for diesel fuel. Heretofore, such peroxides have been manufactured predominantly by the reaction between an organic hydroperoxide (ROOH) and an alcohol in the presence of a strong acid. However, the prior art processes have required large amounts of acid of the order of 1 mol of acid per mol of alcohol and generally have been limited in applicability. The use of such large proportions of acid also presents burdensome disposal problems. In addition, the prior art processes have been somewhat limited in the nature of peroxides that could be made.

Another process has been suggested (U.S. Pat. No. 2,414,769) for the preparation of asymmetrical peroxides. This process involves the reaction in an alkaline medium of a tertiary alkyl hydroperoxide with an ester formed by the interaction between a primary or secondary aliphatic alcohol and a strong inorganic acid such as sulfuric acid. It has also been suggested that this process can employ esters of weak inorganic acids such as silicic or boric acids, but such is not the case since attempts to employ esters of boric acid in this process have proved unsuccessful (see Control C). This process is also limited in the nature of peroxides that can be made and does not appear to give high yields.

Accordingly, the art has been faced with the problem of providing a flexible straightforward process for the manufacture of organic peroxides in high yield.

SUMMARY OF THE INVENTION

In accordance with this invention, it has been found that organic peroxides can be prepared in good yield by the reaction between an organo-boron compound and a second reactant which is selected from the group consisting of an organic hydroperoxide and an alcohol, so long as at least one of the reactants contains an organo-peroxy chemical bond. The reaction takes place in the liquid phase and requires the presence of a small but catalytically effective amount of strong acid.

The nature of the organo-boron compound employed in the process of this invention depends upon the nature of the second reactant, i.e., whether the second reactant is an organic hydroperoxide or an alcohol. When an organic hydroperoxide is used, the organo-boron compound is a borate ester. If an alcohol is used, the organo-boron compound is an organo-peroxyborane (or, as often termed in the art, an organo-peroxyborate). Thus, the process of this invention has, broadly speaking, two major embodiments which are illustrated by the following chemical equations which employ, as illustrative of the present process, but not as limitative thereof, suitable t-butyl derivatives of ortho-boric acid, t-butyl hydroperoxide and t-butyl alcohol:

a. The reaction of an organo-peroxyborane and an alcohol as indicated by the following illustrative chemical equation:

B(—O—O—t—C$_4$H$_9$)$_3$+3t—C$_4$H$_9$OH → 3t—C$_4$H$_9$—O—O—t—C$_4$H$_9$+B(OH)$_3$ b. The reaction of a borate ester and an organic hydroperoxide as indicated by the following illustrative chemical equation:

B(—O—t—C$_4$H$_9$)$_3$+3t—C$_4$H$_9$OOH → 3t—C$_4$H$_9$—O—O—t—C$_4$H$_9$+B(OH)$_3$

This invention is not limited to the conduct of the above reactions in the alternative; both reactions can occur simultaneously if sufficient quantities of the necessary reactants are present. Moreover, it is unnecessary that the organo-boron compound be separately prepared. Indeed, according to a preferred embodiment of this invention, equivalent results are obtained by admixing the organic hydroperoxide, the alcohol reactant, the acid catalyst and a boron oxide, specifically meta-boric acid, pyro-boric acid or boric oxide (B$_2$O$_3$). In effect, the results obtained according to this embodiment are equivalent to an insitu formation of the organo-boron compound although it is not known whether this, in fact, occurs or whether a different reaction mechanism is involved and Applicant does not intend to be bound by either or both explanations except as encompassed within the appended claims.

The products of the process of this invention are the desired peroxide product and boric acid which precipitates from the reaction medium. The boric acid can be recovered and reused in the preparation of additional organo-boron compound or to prepare meta-boric acid, pyro-boric acid or boric oxide. The peroxide can be recovered and, if desired, purified by known techniques.

The process of this invention is applicable to the preparation of symmetrical peroxides, such as di-tertiary butyl peroxide and di-alpha-phenyl ethyl peroxide. It is also applicable to the preparation of unsymmetrical peroxides such as, for example, ethyl-t-butyl peroxide. In many embodiments, the process of this invention results in the obtention of extremely high yields, oft times approaching quantitative, and the process of this invention is extremely flexible and straightforward.

DETAILED DESCRIPTION OF THE INVENTION

As hereinabove indicated, the process of the present invention involves the reaction between an organo-boron compound and an organic hydroperoxide or an alcohol. The boron compound is a peroxyborane when an alcohol is the coreactant and is a borate ester when an organic hydroperoxide is the coreactant. The organo-boron compounds useful in the process of this invention have the following structural formulas.

(a) 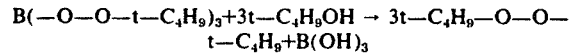

and (b) 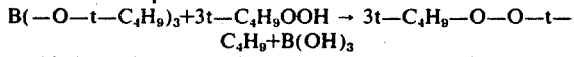

As will be appreciated by those skilled in the art, formula (a) represents the derivatives of ortho-boric acid while formula (b) represents the derivatives of meta-boric acid. As used in the above formulas, "R" can be a T-alkyl radical containing up to 20 carbon atoms, or a secondary or tertiary aralkyl radical; $m$ is an integer from 0 to 3; $n$ is an integer from 0 to 3; $p$ is an integer from 0 to 2; and, the sum of $m+n+p=3$.

As indicated above, derivatives of both ortho and meta boric acid are useful in the process of this invention. In many embodiments, however, it is preferred to employ the derivatives of ortho-boric acid, since, by the stoichiometry of the reactions involved, the maximum product per atom of boron employed is obtained with the ortho-boric acid derivatives and the ortho-boric acid derivatives are somewhat easier to prepare. Also as indicated above, "R" as employed in the above structural formulas can be a t-alkyl radical containing up to 20 carbon atoms, desirably containing up to 10 carbon atoms and preferably containing four to eight carbon atoms. Exemplary of particularly preferred t-alkyl radicals are t-butyl, t-amyl (i.e., 2-methyl-2-butyl) and 2-methyl-2-pentyl.

Also as indicated above, "R" can be a secondary or tertiary aralkyl radical. It is normally desired that the aralkyl radicals employed in the process of this invention be mono- or bicyclic and that they contain not more than about 20 carbon atoms. In addition, it is preferred that the aralkyl radicals be alpha-aralkyl. Exemplary of particularly preferred aralkyl radicals are alpha-phenylethyl, cumyl, alpha-napthylethyl and the like. Also within the scope of suitable aralkyl radicals are the nuclearly substituted aralkyls, suitable substituents including halogen, nitro, alkoxy, thio or nitrilo radicals. Suitable substituted aralkyls include, for example, the alpha- (p-chlorophenyl)-ethyl and meta-nitrocumyl radicals.

To maximize the utilization of the organo-boron compound, thereby minimizing boron compound recycle, and also to maximize yields, it is preferred that organo-boron compounds of the above structural formulas be employed wherein either $m = 3$ or $n = 3$, i.e., it is preferred to use completely esterified or completely peroxidized organo-boron compounds. Such preferred organo-boron compounds also facilitate adjustment of the ratio of one reactant to the other and thereby assist in reaction control.

The coreactants for the organo-boron compound have the following structural formulas:

c. R—O—OH
d. R*—OH

As indicated, formula (c) is that of an organic hydroperoxide and "R" as used therein, is as defined above in connection with the description of the organo-boron compound. Suitable, desired and preferred organic radicals represented by "R" in formula (c) above are those enumerated above in connection with the description of the organo-boron compounds. As used in formula (d), "R*" is an aralkyl radical or an alkyl radical containing up to 20 carbon atoms. Note that, in contrast to the foregoing, "R*" can be a primary as well as a secondary or tertiary radical. "R*" desirably contains less than 15 carbon atoms and preferably contains from one to eight carbon atoms. Exemplary of suitable radicals represented by "R*" in formula (d) are the methyl, ethyl, propyl, isopropyl, butyl, T-butyl, 2-methyl-2-butyl, neopentyl, 2-methyl-2-pentyl, and n-octyl radicals. Exemplary of suitable aralkyl radicals represented by "R*" in the foregoing formula (d) are the alpha-phenylethyl, 2-(2-methylphenyl) ethyl, 2-(2-phenyl) propyl, 2-(5,6-benzocyclohexyl), cumyl, 3-phenyl-1-propyl, 4-(gamma-naphthyl)-2-pentyl, and the like. Particularly preferred organic radicals represented by "R*" in the above formulas include the t-butyl, 2-methyl-2-butyl, alpha-phenylethyl, cumyl and ethyl radicals.

As hereinabove indicated the nature of the organo-boron compound and of its coreactant or coreactants (i.e., organo-hydroperoxide and/or alcohol) are interrelated. In terms of the above formulas (a–d), these interrelations are as follows:

1. When $m$ is 0, the coreactant must include an organic hydroperoxide.
2. When $n$ is 0, the coreactant must include an alcohol.
3. When the coreactant is solely an alcohol, the value of $m$ must be at least one.
4. When the coreactant is solely an organic hydroperoxide, the value of $n$ must be at least one.
5. When both $m$ and $n$ are greater than 0, either or both an alcohol and an organic hydroperoxide coreactant can be employed.

The process of the invention requires, as a catalyst, the presence or a small amount of a strong acid. By "strong acid" is meant one which, in dilute water solution (0.1 N or more dilute) is highly ionized. Thus, acids useful as catalysts in the process of this invention in dilute water solution have a pK (measured at about 15° to 25° C.) which is less than about 3.5 and preferably have a pK which is less than about 2. Exemplary of such acids are sulphuric acid, phosphoric acid, perchloric acid, aryl sulfonic acids, e.g., p-toluene sulfonic acid and the other sulfonic acids of benzene and its homologues, trichloracetic acid, and the like. Since the presence of substantial amounts of free water in the reaction medium results in hydrolysis of the organo-boron compound, resulting in the precipitation of boric acid, it is desired to use the acid catalyst in concentrated form (e.g., at concentrations of 70 percent by weight or more). Thus, while hydrofluoric acid and hydrochloric acid are suitable catalysts for the reaction of this invention, it is preferred that they not be employed in the form of their aqueous solutions. Instead, preferably, they are introduced to the reaction medium in the form of hydrogen chloride vapor or hydrogen fluoride vapor. The preferred strong acid catalysts are those which are available in highly concentrated forms, as liquids, without the presence of substantial amounts of free water, such as, for example, sulfuric acid, perchloric acid, and p-toluene sulfonic acid. Phosphoric acid, trichloroacetic acid and hydrofluoric acid while useful as catalysts are less preferred. The use of sulfuric acid (approximate pK for the first dissociation step = −3.0 at 25° C.) is especially preferred since it is readily available in highly concentrated form at low cost.

Only a small amount of acid catalyst is required, as little as 0.001 percent by weight of reactants being sufficient. Substantially greater amounts of acid catalyst, for example up to 20 percent by weight of reactants or even more can be used but little advantage is obtained thereby. It is normally desired to use from about 0.1 percent to about 10 percent by weight of the reactants of acid as catalyst and amounts of acid catalyst between about 0.5 percent and about 5 percent by weight of the reactants are preferred.

The reaction of the organo-boron compounds and the organic hydroperoxide or alcohol to produce the organic peroxide is conducted in the liquid phase by admixing the organo-boron compound with the hydroperoxide or alcohol under suitable conditions. Suitable temperatures are within the range of from 0° to about 100° C., desirably within the range from about 20° to about 80° C. and preferably within the range from about 30° to about 60° C.

Pressure is not critical so long as it is sufficient to maintain liquid phase. Pressures ranging from about 1 p.s.i.a. or higher can be employed although it is normally preferred to employ pressures above atmospheric to minimize equipment construction costs and to avoid air in-leakage.

The reaction can be conducted with or without a solvent, although the use of solvents is normally desired. Suitable solvents are those organic materials which are inert under the conditions of the reaction and include the aromatic hydrocarbons, the cycloaliphatic hydrocarbons and the saturated aliphatic hydrocarbons. The only restriction is that the solvent be normally liquid under the reaction conditions employed. Oxygenated hydrocarbons, for example, ketones and ethers, which are relatively nonreactive under the conditions employed can also be used. Mixtures of solvents can also be used. Exemplary of satisfactory solvents for use in the practice of this invention are benzene, toluene, the xylenes, cyclohexane, methylcyclohexane, n-heptane, mineral spirits, methylethyl ketone, diethyl ether and the like. The reaction of this invention can also be conducted in the absence of extraneous solvents or in the presence of an alcohol which can be identical with the alcohol reactant if present in sufficient excess.

The ratio of organo-boron compound to its coreactant employed in the reaction of this invention is not critical an, on a molar basis, can be within the range of from 1:10 to 30:1. However, it is desired to employ ratios which are in the range of about 1:5 to about 5:1 and it is preferred to employ ratios which, depending upon the precise nature of the organo-boron compounds and its coreactant, are approximately correspondent to the stoichiometry of the reaction, i.e., about 1:3 when employing ortho boric acid derivatives and about 1:1 when employing meta boric acid derivatives.

Suitable reaction times for the conduct of the process of this invention vary, depending upon the precise reactants employed. Generally, reaction times between about 10 minutes and about 20 hours are suitable. Employing the preferred reactants discussed above the conjunction with suitable catalysts and solvents, reaction times will generally be within the range of about 30 minutes to about 8 hours.

After completion of the reaction, the peroxide product may be recovered in a variety of ways. One such recovery procedure involves filtration or centrifugation to remove the boric acid byproduct, yielding a crude peroxide product as the filtrate. Alternatively, once the reaction is completed the boric acid can be solubilized by, for example, contacting the reaction effluent with sufficient water or other solvent to dissolve the boric acid. The crude peroxide product can then be refined by washing it with water and/or aqueous alkaline materials, e.g., alkali or alkaline earth metal carbonates, bicarbonates, hydroxide, etc., to remove acid catalyst, residual boron and any unreacted alcohol or hydroperoxide present. The resulting product is then in the form of a solution of the desired peroxide product in whatever solvent was employed in the reaction. For many purposes, this solution will be sufficient for use without further processing. However, if a more concentrated product is desired, residual solvent may be removed by conventional means known to those skilled in the are, e.g., by vacuum distillation.

As stated above, the organo-boron compound can be prepared separately prior to the conduct of the process of this invention. Alternatively, and in a preferred embodiment, equivalent results are obtained when a boron oxide, specifically meta-boric acid, pyro-boric acid or boric oxide ($B_2O_3$) is added to a mixture of an organic hydroperoxide and an organic alcohol with or without the addition of an extraneous solvent. Thereafter, the reaction of this invention is conducted by addition of more reactants to the resulting slurry, adjustment of operating conductions or by the addition of strong acid catalyst or by any combination thereof. In this embodiment, the use of boric oxide ($B_2O_3$) is preferred. The amount of boron oxide added in accordance with this preferred embodiment should be sufficient to provide at least one gram atom of boron per six gram moles of hydroperoxide reactant, desirably is sufficient to provide one gram atom of boron per three gram moles of hydroperoxide reactant and preferably is sufficient to provide two gram atoms of boron per three gram moles of hydroperoxide. There is no upper limit in the amount of boron oxide that can be employed in this embodiment other than the practical one imposed by economics and, the necessity for agitation of the resultant slurry to obtain adequate mixing. Reaction temperatures, pressures, reactant ratios, times and the like for this embodiment are as described above.

Processes for the manufacture of borate esters, organic hydroperoxides, and alcohols are well-known to those skilled in the art. Processes for the manufacture of organo-peroxyboranes are also known to those skilled in the art, but being of relatively recent development, are less well-known, even though described in the literature; see, for example, Steinberg and McClosky (editors) PROGRESS IN BORON CHEMISTRY, Vol. 1, MacMillan New York (1964) at page 265 et seq. Particularly suitable processes for the preparation of organo-peroxyborane reactants are also disclosed in copending application Ser. No. 510,366, filed Nov. 29, 1965.

According to this copending application, a particularly advantageous method for the preparation of organo-peroxyborane is by the reaction of an organic hydroperoxide with an alkoxy borane or boric acid or a boron oxide. One of these methods is illustrated by the following chemical equation:

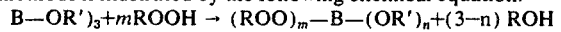

In this equation, $m$ is an integer of 1 to 3, $n$ is an integer of 0 to 2, and $m+n=3$. As used in this equation, R' is hydrogen or a lower alkyl radical having one to six carbon atoms and R is as heretofore defined.

During the reaction, a hydroxyl compound is formed. When the starting material for the preparation of the organo-peroxyborane is a boric acid the hydroxyl compound coproduct is water. Similarly, when the boron reactant is a trialkoxyborane the coproduct of the reaction will be the alcohol or alcohols corresponding to the alkyl substituents of the boron compound. Whether the boron compound is a trialkoxyborane or a boric acid, the hydroxyl compound coproduct is preferably removed from the reaction zone as the reaction proceeds.

The reaction for the preparation of the organo-peroxyborane is conveniently carried out at temperatures within the range of from about 40° to about 175° C. at pressures which are normally within the range of from 1 to 50 p.s.i.a. The molar proportions of the reactants, expressed as moles of hydroperoxide per atom of boron, preferably ranges from 1:10 to 10:1 and most suitably is in the range of from 1:2 to 2:1.

Specific examples of peroxyboranes which can be prepared in this manner and which are useful starting materials for the process of this invention, are dimethoxy-alpha-phenylethyl-peroxyborane, methoxy-di-alpha phenylethyl-peroxyborane, tri-(alpha-phenylethylperoxy) borane, the corresponding alpha, alpha-dimethylperoxyboranes, the corresponding ethoxy, n-propoxy, 1-propoxy compounds, di-(tertiary butoxy)-tertiary butylperoxyborane, tertiary butoxy di-(tertiary butylperoxy) borane, tri-(t-butylperoxy) borane, and the like. Of these, compounds such as tri-(alpha-phenylethylperoxy) borane, tri-(t-butyl-peroxy) borane and tri-(cumylperoxy) borane are preferred.

EXAMPLES

The following examples are presented to further illustrate this invention but are not intended as limiting the scope thereof. Unless otherwise stated, all parts and percents in the following examples are by weight.

EXAMPLE I

Di-tertiary-butyl peroxide is prepared as follows: To 2.5 part of tri-tertiary-butyl borate are added 16 parts of a 20 percent (by weight) solution of t-butyl hydroperoxide in benzene. The resulting admixture has a molar ratio of organo-boron compound to hydroperoxide of about 1:3. To this admixture are added 0.18 parts of 98 percent sulfuric acid, amounting to approximately 1 percent of sulphuric acid by weight of reactants present in the admixture. The admixture is then heated to 60° C. and maintained at this temperature for approximately 15 hours. During this time it is noted that a white precipitate of boric acid forms and settles to the bottom of the reaction vessel. At the end of this period the mixture is cooled, washed with water, and then washed with aqueous 15 percent sodium bicarbonate solution. The product, in the form of a benzene solution of di-tertiary-butyl peroxide is analyzed. It is found that a yield of substantially 100 percent, (molar basis) of di-t-butyl peroxide, based on hydroperoxide, is obtained.

CONTROL A

The procedure of example I is repeated employing tertiary-butyl alcohol instead of an organo-boron compound. The molar ratio of alcohol to hydroperoxide is 1:1. A yield of only 50 percent (molar basis) of di-t-butyl peroxide is obtained.

EXAMPLE II

EXAMPLE II

Di-tertiary-butyl peroxide is prepared as follows: To 10 parts of tri-teriary-butyl peroxyborane in the form of a 12 percent solution in benzene, are added 0.98 parts of tertiary-butyl alcohol. The resulting admixture has a molar ratio of organo-boron compound to alcohol of 1:3. To this admixture are added 0.12 parts of 98 percent sulphuric acid (equivalent to 1 percent by weight of sulphuric acid based upon the reactants present in the admixture). The admixture is then heated to 60° C. and maintained at this temperature for 15 hours. At the end of this period the reaction mixture is cooled and processed as indicated above in connection with example I. Analysis indicates a molar yield of 80 percent of di-tertiary-butyl peroxide based upon the amount of peroxyborane charged.

EXAMPLE III

Example I is repeated employing a 20 percent solution of t-butyl hydroperoxide in t-butyl alcohol instead of in benzene solution. A molar yield of 66 percent of di-tertiary-buyl peroxide, based upon tertiary-butyl hydroperoxide charged, is obtained.

EXAMPLE IV

The procedure of example II is repeated employing a sufficient amount of a 40 percent solution of tri-t-butyl peroxyborane in tertiary-butyl alcohol to provide a molar ratio of peroxyborane to alcohol of 1:3. After 15 hours at ambient temperature, it is found that a 40 percent yield (mole basis) of di-tertiary-butyl peroxide is obtained based upon the peroxyborane charged.

CONTROL B

For comparison, example IV is repeated employing an equivalent molar amount of a 40 percent solution of t-butyl hydroperoxide in T-butanol instead of the t-butyl peroxyborane. A molar yield of only 5 percent of di-tertiary-butyl peroxide based upon tertiary-butyl hydroperoxide is obtained.

EXAMPLE V

To a reaction vessel are charged 1.56 parts of triethyl borate, 3.84 parts of a solution of t-butyl hydroperoxide in benzene (84 percent hydroperoxide), and 10 parts of ethanol. Also added to the reaction vessel are 0.16 parts of 98 percent sulfuric acid corresponding to approximately 1 percent by weight of sulfuric acid based on total charge. The reaction vessel is allowed to stand for 16 hours at 60° C. At the end of this time, this reaction vessel is opened and the contents thereof are analyzed. The hydroperoxide conversion is found to be 72 percent and the molar selectivity to ethyl t-butyl peroxide, based on T-butyl hydroperoxide consumed, is 77 percent.

CONTROL C

Example V is repeated except that 1.34 parts of NaOH is added instead of $H_2SO_4$. This corresponds to 1 mole of NaOH per mole of T-butyl hydroperoxide. Upon analysis, it is found that 95 percent of the hydroperoxide is converted and that ethyl T-butyl peroxide is nondetectable in the effluent, i.e., the selectivity to ethyl t-butyl peroxide is nil.

EXAMPLE VI

To 15 parts of a 21.2 percent solution of tertiary-butyl hydroperoxide in benzene and 2.44 parts tertiary-butanol are added 1.45 parts of meta-boric acid and 0.2 parts of 98 percent sulphuric acid (equivalent to 1 percent by weight of sulphuric acid based upon reactants present). The resultant admixture is heated to 60° C. and maintained at this temperature for 15 hours. At the end of this period the mixture is cooled and processed as in example I. It is found that 100 percent of the tertiary-butyl hydroperoxide is converted and that the selectivity to di-tertiary-butyl peroxide, based upon hydroperoxide charged, is 89 percent (molar basis).

EXAMPLE VII

Example VI is repeated employing 0.77 parts of boron oxide ($B_2O_3$) in place of the meta-boric acid. All of the hydroperoxide is converted and the molar selectivity to di-tertiary-butyl peroxide, based on hydroperoxide is 96 percent.

EXAMPLE VIII

To 4.1 parts of tri-(alpha-phenylethyl) borate are added 22.8 parts of a 20 percent by weight solution of alpha-phenylethylhyroperoxide in ethylbenzene. The resulting admixture has a molar ratio of organo-boron compound to hydroperoxide of about 1:3. To this admixture are added 0.27 parts of 98 percent sulphuric acid, corresponding to 1 percent of sulfuric acid by weight of reactants. The mixture is maintained at 60° C. for approximately 8 hours and then analyzed. A yield of 70 percent (molar basis) of di-(alpha-phenylethyl) peroxide is obtained.

EXAMPLE IX

Example VIII is repeated employing 25 parts of a 20 percent solution of cumene hydroperoxide in cumene and 4.6 parts of tricumyl borate in place of the corresponding ethylbenzene derivatives of example VIII. A yield of 90 percent (molar basis of di-cumyl peroxide is obtained.

EXAMPLE X

Example I is repeated employing 16 parts of a 20 percent solution of 2-methyl-2-butyl-hydroperoxide in benzene and 3.0 parts of tri-(2-methyl-2-butyl borate in place of the T-butyl derivatives of example 1. A yield of 93 percent (molar basis) of di-(2-methyl-2-butyl) peroxide is obtained.

EXAMPLE XI

To a solution of 3.9 parts of 2-methyl-2-pentyl hydroperoxide in 11.5 parts of 2-methyl-2-pentanol are added 1.5 parts of meta-boric acid and 0.18 parts of 98 percent sulphuric acid. The resultant admixture is heated to 60° C. and maintained at this temperature for 10 hours. At the end of the time, 80 percent of the hydroperoxide charged has been converted and the selectivity to di-(2-methyl-2-pentyl) peroxide is 85 percent (molar basis).

EXAMPLE XII

Example XI is repeated employing 1.1 parts of pyro-boric acid instead of meta-boric acid. A selectivity to di(2-methyl-2-pentyl) peroxide is 89 percent (molar basis). A similar run employing 0.8 parts of $B_2O_3$ instead of pyro-boric acid results in a selectivity of 91 percent.

EXAMPLE XIII

Example V is repeated employing 30 parts of a 15 percent solution of alpha-phenylethyl hydroperoxide (ethylbenzene hyderperoxide) in ethylbenzene in place of tertiary-butyl hydroperoxide. A 16 percent yield of ethyl-(alpha-phenylethyl) peroxide is obtained.

EXAMPLE XIV

Example XIII is repeated employing 3.0 of tri-butyl borate instead of tri-ethyl borate. A yield of 11 percent of butyl (alpha-phenylethyl peroxide is obtained.

EXAMPLE XV

A series of runs are conducted to demonstrate the effect of temperature upon yield in the systems of examples I and II. Table I below illustrates the results obtained.

TABLE I

[All runs with molar ratio of organo-boron compound to alcohol of 1:3]

| Run No. | System [1] | Temp., ° C. | Reaction time, hrs. | Percent selectivity to peroxide [2] |
|---|---|---|---|---|
| 1 | I | 20 | 10 | 100 |
| 2 | II | 20 | 10 | 95 |
| 3 | I | 40 | 8 | 96 |
| 4 | II | 40 | 8 | 85 |
| 5 | I | 80 | 4 | 92 |
| 6 | II | 80 | 4 | 75 |
| 7 | I | 100 | 2 | 85 |
| 8 | II | 100 | 2 | 45 |

[1] I indicates the reaction between the borate ester and the hydroperoxide. II indicates the reaction between the alcohol and the peroxyborane.
[2] Moles of di-t-butyl peroxide obtained per mole of t-butyl hydroperoxide converted.

[All runs at 60° C. for 15 hours with molar ratio of organo-boron compound to alcohol of 1:3]

EXAMPLE XVI

A series of runs are conducted to demonstrate the effect of changing catalyst and catalyst concentration upon the system of examples I and II. The results of these runs are summarized in the table II below.

TABLE II

[All runs at 60° C. for 15 hours with molar ratio of organo-boron compound to alcohol of 1:3]

| Run No. | System [1] | Acid | Percent acid [2] | Percent selectivity to Peroxide [3] |
|---|---|---|---|---|

| | | | | |
|---|---|---|---|---|
| 1 | I | H²SO⁴ (98%) | 0.1 | 98 |
| 2 | I | H²SO⁴ (98%) | 0.5 | 95 |
| 3 | I | H²SO⁴ (98%) | 5.0 | 91 |
| 4 | I | p-Toluene sulfonic | 0.5 | 96 |
| 5 | I | ...do... | 1.0 | 97 |
| 6 | I | ...do... | 5.0 | 92 |
| 7 | II | Perchloric | 1.0 | 86 |
| 8 | II | ...do... | 5.0 | 80 |
| 9 | II | Benzene sulfonic | 0.5 | 92 |
| 10 | II | ...do... | 2.0 | 87 |
| 11 | II | Hydrogen fluoride⁴ | | 82 |

[1] I indicates the reaction between the borate ester and the hydroperoxide. II indicates the reaction between the alcohol and the peroxyborane.
[2] Expressed as percent by weight of strong acid catalyst based on amount of reactants charged.
[3] Moles of di-t-butyl peroxide obtained per mole of t-butyl hydroperoxide converted.
[4] Reactor pressured to 25 p.s.i.a. with hydrogen fluoride supplied to reactor as a vapor.

It is to be noted from the data in table II that neither the nature or the amount of catalyst affects peroxide yield appreciably.

EXAMPLE XVII

The procedure of examples I and II are repeated in a series of runs to demonstrate the effect of varying reactant ratios upon yield. The results of these runs are summarized below in table III.

TABLE III

[All runs at 60° C. for 15 hours employing 1% of concentrated (98%) sulfuric acid as catalyst]

| Run No. | Moles borate ester, Moles hydroperoxide | Moles peroxyborane, Moles alcohol | Percent selectivity to peroxide percent [1] |
|---|---|---|---|
| 1 | 0.5/1 | | 95 |
| 2 | 1/1 | | 92 |
| 3 | 2/1 | | 92 |
| 4 | 4/1 | | 90 |
| 5 | 5/1 | | 87 |
| 6 | | 0.5/1 | 82 |
| 7 | | 1/1 | 70 |
| 8 | | 2/1 | 58 |
| 9 | | 4/1 | 42 |
| 10 | | 5/1 | 37 |
| 11 | | 1/5 | 85 |
| 12 | | 1/6 | 83 |
| 13 | 1/6 | | 84 |
| 14 | 1/5 | | 89 |
| 15 | 1/1 | 1/1 | 92 |

[1] Moles of peroxide formed per mole of peroxyborane and/or hydroperoxide converted.

EXAMPLE XVIII

To a reactor equipped with an agitator and an 18 plate Oldershaw-type distillation column are charged 12.4 parts of meta-boric acid, 75 parts of t-butyl hydroperoxide (100 percent basis but in the form of a 20 percent solution in t-butanol.). The reactor contents are heated to 58° C. at 130 mm. Hg. Volatillized material is fed to the distillation column; the overhead material, the TBA-H₂O azeotrope, is condensed and collected at a reflux ratio of 15:1 (ratio of liquid reflux to net overhead product). After the reaction has continued for 12 hours, the reactor contents are cooled. Analysis indicates that less than 5 percent of the hydroperoxide is lost or destroyed during this distillation.

To 100 parts of the above solution are added 150 parts of p-xylene. The mixture is heated to 58° C. at 24 mm. Hg and maintained at these conditions for 2 hours. The t-butanol distilled overhead is collected at a reflux ratio of 10:1. Analysis indicates the predominant product to be t-butoxy-di-(t-butyl-peroxy) borane in p-xylene solution To 100 parts of the peroxyborane solution obtained as described above, are added 9 parts of additional t-butanol so that the resulting admixture has a molar ratio of organo-peroxy groups to hydroxyl group of 1:1. Concentrated sulfuric acid (98 percent; 0.7 parts) is added to give an acid concentration of 0.5 percent by weight of the reactants. This admixture is heated to 30° C. and maintained at this temperature for 16 hours. The mixture is then cooled and analyzed. It is found that a 91 percent yield (molar basis) of di-t-butyl peroxide, based on t-butyl hydroperoxide consumed, is obtained.

The foregoing description illustrates the methods of this invention whereby the flexibility and the advantages thereof are obtained. It will be understood that modifications and variations thereof may be effected by those skilled in the art without departing from the spirit of my invention. Accordingly, it is intended that all matter contained in the foregoing description shall be interpreted as illustrative and not in a limiting sense.

What is claimed is:

1. A process for the preparation of organic peroxide which process comprises the step of reacting at a temperature of 0° to 100° C. a first component and a second component in a liquid phase reaction medium in the presence of a catalytically effective amount of an acid which in dilute water solution at about 15° to 25° C. has a pK less than about 3.5, the amount of acid being at least 0.001 percent by weight of the reactants, said first component being an organo-boron compound selected from the group consisting of:

(a)

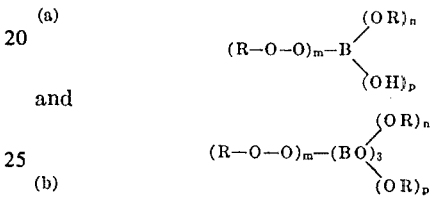

and (b)

said second component being at least one member selected from the group consisting of:

c. R—O—OH; and, d. R*—OH wherein R is an organic radical selected from the group consisting of t-alkyl radicals containing not more than 20 carbon atoms and secondary or tertiary aralkyl radicals; R* is an organic radical selected from the group consisting of alkyl radicals containing not more than 20 carbon atoms and aralkyl radicals containing not more than 20 carbon atoms; $m$ is an integer from 0 to 3; $n$ is an integer from 0 to 3; $p$ is an integer from 0 to 2; and, $m+n+p=3$; said second component being a compound of type (c) when $m$ is 0; and said second component being a compound of type (d) when $n$ is 0; $m$ being at least 1 when said second component is of type (d) only; and, $n$ being at least 1 when said second component is of type (c) only.

2. A process in accordance with claim 1 wherein the strong acid is selected from the group consisting of sulphuric acid, phosphoric acid, perchloric acid, aryl sulfonic acids, and trichloracetic acid.

3. A process in accordance with claim 2 wherein the amount of acid catalyst is between about 0.001 percent and about 20 percent by weight of the total of reactants present in the reaction medium.

4. A process in accordance with claim 1 wherein the organo-boron compound functionally is formed in situ by admixing an organic hydroperoxide of type (c) with an alcohol of type (d) in the presence of a boron oxide selected from the group consisting of meta-boric acid, pyro-boric acid and boric oxide.

5. A process in accordance with claim 4 wherein the amount of boron oxide is at least sufficient to provide one gram atom of boron per six gram moles of organic hydroperoxide.

6. A process in accordance with claim 1 wherein the reaction is conducted in the presence of an inert solvent selected from the normally liquid members of the group consisting of saturated aliphatic hydrocarbons, saturate cycloaliphatic hydrocarbons, aromatic hydrocarbons, ketones and ethers.

7. A process in accordance with claim 1 wherein the reaction is conducted at a temperature within the range from 0° to about 100° C.

8. A process in accordance with claim 1 wherein the molar ratio of first component to second component is within the range of from 1:10 to 30:1.

9. A process in accordance with claim 1 wherein R and R* are each selected from the group of organic radicals consisting of t-butyl, 2-methyl-2-butyl, 2-methyl-2-pentyl, alpha-phenylethyl, cumyl, and alpha-naphthylethyl.

10. A process for the preparation of organic peroxides which process comprises reacting an organic hydroperoxide having not more than 20 carbon atoms per molecule selected from the group consisting of t-alkyl hydroperoxide and secondary or tertiary aralkyl hydroperoxides with an alkyl or aralkyl alcohol having not more than 20 carbon atoms per molecule, said reaction being conducted in the liquid phase in the presence of a boron oxide selected from the group consisting of meta-boric acid, pyro-boric acid and boric oxide in an amount sufficient to provide at least one gram atom of boron per six gram moles of organic hydroperoxide and said reaction being conducted in the presence of a catalytically effective amount of an acid which in dilute water solution at about 15° to 25° C. has a pK less than about 3.5, the amount of acid being at least 0.001 percent by weight of the reactants.

11. A process in accordance with claim 10 wherein the organic hydroperoxide is t-butyl hydroperoxide and the alcohol is t-butanol.

* * * * *